(12) United States Patent
Badger, II

(10) Patent No.: US 9,589,404 B2
(45) Date of Patent: Mar. 7, 2017

(54) METHOD AND APPARATUS FOR REMOTE VEHICLE KEYPAD ENABLEMENT AND DISABLEMENT

(71) Applicant: Ford Global Technologies, LLC, Dearborn, MI (US)

(72) Inventor: Charles Everett Badger, II, Garden City, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/731,982

(22) Filed: Jun. 5, 2015

(65) Prior Publication Data

US 2016/0358392 A1 Dec. 8, 2016

(51) Int. Cl.
*G07C 9/00* (2006.01)
*B60R 25/23* (2013.01)
*E05B 81/04* (2014.01)
*E05B 81/56* (2014.01)
*E05B 49/00* (2006.01)

(52) U.S. Cl.
CPC .......... *G07C 9/00142* (2013.01); *B60R 25/23* (2013.01); *E05B 49/00* (2013.01); *E05B 81/04* (2013.01); *E05B 81/56* (2013.01); *G07C 9/0069* (2013.01); *G07C 9/00166* (2013.01); *G07C 9/00309* (2013.01); *G07C 9/00698* (2013.01)

(58) Field of Classification Search
CPC .......... G07C 2009/00825; G07C 2009/00833; G07C 2009/00841; G07C 2009/00849; G07C 2009/00865; G07C 2009/00873; G07C 9/00817; G07C 9/00857; G07C 9/00309; B60R 25/00; B60R 25/04; E05B 39/00; E05B 45/06; E05B 41/00; E05G 1/10
See application file for complete search history.

(56) References Cited

U.S. PATENT DOCUMENTS

| | | | | |
|---|---|---|---|---|
| 4,843,385 A * | 6/1989 | Borras | ................. | G07C 9/0069 340/5.33 |
| 5,613,388 A | 3/1997 | Murphree | | |
| 6,097,306 A * | 8/2000 | Leon | ........................ | G07C 1/32 340/10.1 |
| 6,157,317 A * | 12/2000 | Walker | .................... | B60R 25/04 307/10.3 |
| 6,166,627 A * | 12/2000 | Reeley | .................. | B60R 25/102 340/426.18 |
| 6,323,752 B1 * | 11/2001 | Takizawa | ................ | B60R 11/02 340/5.22 |
| 6,538,557 B1 * | 3/2003 | Giessl | .................... | B60R 25/24 340/12.5 |
| 6,606,492 B1 * | 8/2003 | Losey | .................. | B60Q 3/0293 307/10.2 |
| 7,129,852 B2 * | 10/2006 | Aslund | .................. | G07C 5/008 123/335 |

(Continued)

*Primary Examiner* — Brian Miller
(74) *Attorney, Agent, or Firm* — Jennifer Stec; Brooks Kushman P.C.

(57) ABSTRACT

A system includes a processor configured to determine that a number of invalid attempts to input a code into a vehicle door keypad has passed a predetermined threshold. The processor is also configured to notify a registered user through a vehicle telematics system of the invalid attempts and selectively ignore future attempts to input the code.

5 Claims, 2 Drawing Sheets

(56) References Cited

U.S. PATENT DOCUMENTS

| | | | |
|---|---|---|---|
| 7,236,085 B1 | 6/2007 | Aronson et al. | |
| 7,961,076 B2* | 6/2011 | Kelley | B60R 25/257 340/426.13 |
| 8,154,383 B2* | 4/2012 | Brombach | G07C 9/00309 340/5.72 |
| 8,368,522 B1* | 2/2013 | Kralj | B60R 25/10 340/426.18 |
| 8,385,883 B2* | 2/2013 | Rajan | G06F 21/88 340/5.31 |
| 8,587,405 B2* | 11/2013 | Denison | B60R 25/102 340/5.64 |
| 8,912,884 B2* | 12/2014 | Fisher | G07C 9/00571 235/382 |
| 8,918,232 B2* | 12/2014 | Lavi | G07C 5/008 455/421 |
| 8,928,457 B2* | 1/2015 | Jin | E05B 47/0611 340/5.63 |
| 9,085,919 B2* | 7/2015 | Bacon | E05B 13/10 |
| 9,109,379 B1* | 8/2015 | Ranchod | E05B 67/00 |
| 9,211,811 B2* | 12/2015 | Breed | B60C 11/24 |
| 9,227,595 B2* | 1/2016 | Yang | B60R 25/102 |
| 2004/0160319 A1* | 8/2004 | Joao | B60R 25/018 340/539.1 |
| 2007/0001826 A1* | 1/2007 | Lanier | B60R 25/04 340/425.5 |
| 2007/0289012 A1* | 12/2007 | Baird | H04L 9/321 726/17 |
| 2011/0241829 A1* | 10/2011 | Baldwin | G07C 9/00944 340/5.54 |
| 2014/0181954 A1* | 6/2014 | Robertson | G06F 21/31 726/17 |
| 2014/0210592 A1* | 7/2014 | Van Wiemeersch | G07C 9/00309 340/5.61 |
| 2014/0338409 A1* | 11/2014 | Kraus | E05B 81/76 70/278.1 |
| 2015/0294518 A1* | 10/2015 | Peplin | B60R 25/23 340/5.22 |

* cited by examiner

METHOD AND APPARATUS FOR REMOTE VEHICLE KEYPAD ENABLEMENT AND DISABLEMENT

TECHNICAL FIELD

The illustrative embodiments generally relate to a method and apparatus for remote vehicle keypad enablement and disablement.

BACKGROUND

Many vehicles include a vehicle keypad provided on a vehicle door. This keypad can accept a code input that will unlock the vehicle if the proper code is input. With a four digit code, for example, there are 625 possibilities for unlocking the door if five discrete buttons are employed. If a party interested in stealing a vehicle were to view a partial code, or evidence of what buttons had been pressed, this number of attempts needed to infiltrate the vehicle could be greatly diminished. If working at night (in a driveway for example) a persistent thief could simply brute force try combinations until a vehicle was unlocked. If only a few attempts were needed (because a partial code was known or could be guessed), a vehicle could be entered even in broad daylight.

One example of a solution to defeating this issue includes a self-powered electronic combination lock that rotates an outer dial to cause generators to generate energy for storage in a capacitor bank. A user then rotates an inner dial to cause a microcontroller to sequentially display a combination of numbers, and presses the inner dial to select a displayed number. The microcontroller determines direction and extent of motion of the inner dial by receiving signals derived from Wiegand sensors placed in proximity to a magnetized disc which rotates integrally with the inner dial, and controls the display of numerals on an LCD display accordingly. When the microcontroller determines that a correct combination has been entered, it activates a motor to move a motor cam to act directly on a locking lever so that the locking lever can engage a drive cam integrally linked with the inner dial, to allow the inner dial to withdraw the lock's bolt. Software features, as well as power level monitoring features, cause the locking lever to be moved away from the drive cam to prevent the bolt from being withdrawn if it has not already been withdrawn within a given time window. Integral bearing/retaining members make the lock dials tamper-evident. After a given number of successive incorrect combination entries, an "override" combination, which is preferably a longer, mathematical variation of normal combinations, is necessary to open the lock.

Another example includes a method for controlling access to a storage unit owned by an owner, wherein a renter has access to the storage unit unless the owner receives the legal right to deny the renter access to the storage unit and decides to do so. In this method, the storage unit is secured by a lock that is, at least in part, controlled by the renter. A remotely controllable lockout assembly, however, is capable of over locking the storage unit so that the renter can no longer gain entry when the lockout assembly is activated. The method includes remotely controlling the lockout assembly to deny the renter access to the unit when the owner receives the legal right to deny the renter access to the storage unit and decides to do so.

SUMMARY

In a first illustrative embodiment, a system includes a processor configured to determine that a number of invalid attempts to input a code into a vehicle door keypad has passed a predetermined threshold. The processor is also configured to notify a registered user through a vehicle telematics system of the invalid attempts and selectively ignore future attempts to input the code.

In a second illustrative embodiment, a system includes a processor configured to receive a request to control a vehicle door keypad state from a remote device. The processor is also configured to validate the request. The processor is further configured to receive a current vehicle door keypad state from a vehicle. The processor is additionally configured to send the current vehicle door keypad state to the remote device and send an instruction to change the vehicle door keypad state to the vehicle, responsive to an instruction to change the vehicle door keypad state received from the remote device.

In a third illustrative embodiment, a computer-implemented method includes sending a message via a vehicle telematics system to notify a registered user of the invalid attempts in response to a number of invalid attempts to input a code into a vehicle door keypad exceeding an associated threshold. The method also includes selectively disabling vehicle feature access in response to subsequent input of a valid code.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
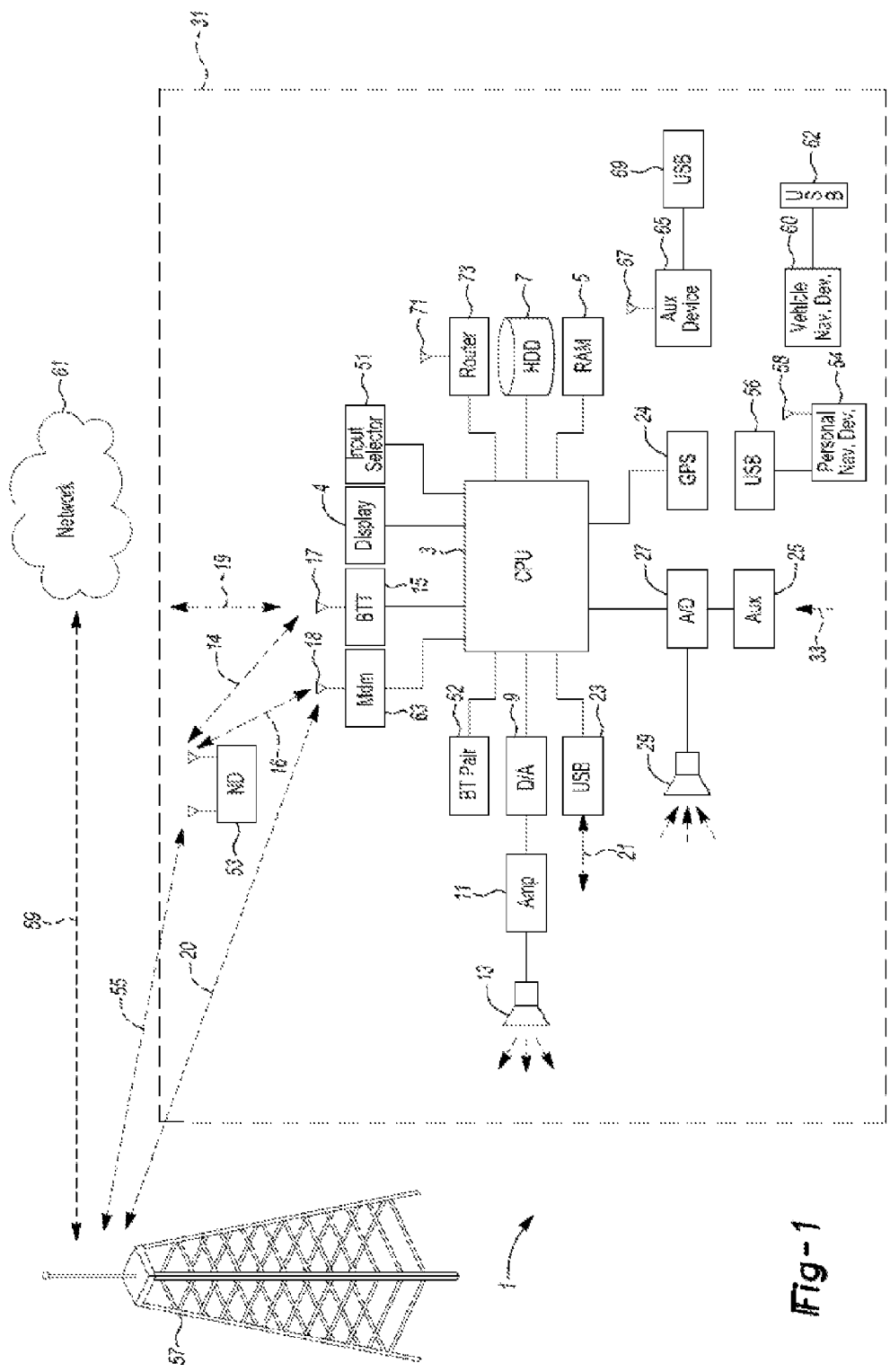
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

While it may be common to lock out, for example, a password after a certain number of failed attempts, the password attempter (if a valid party) can typically obtain some easy assistance in unlocking the password. Locking out a vehicle entry panel, however, can present some unique challenges. Since the user is outside a vehicle, and may be located remotely from alternative transportation and/or assistance, simply disabling the door panel and waiting, for example, for a vehicle key or fob to arrive to re-enable the panel, may leave a legitimate vehicle owner in a precarious position.

Accordingly, in the illustrative examples, instead of merely disabling the panel, when a disabling feature is engaged, in one example, a notification is sent to a validated user. It is possible, if a code is forgotten, that this user may be the very party attempting to enter the vehicle. The user will be able to re-enable the door panel remotely, and thus a valid party can continue to attempt entry. In other examples, the user can choose whether or not to disable the door panel, which can prevent inadvertent disabling of a panel that needs to be functional for a legitimate entry attempt.

Figure 2:
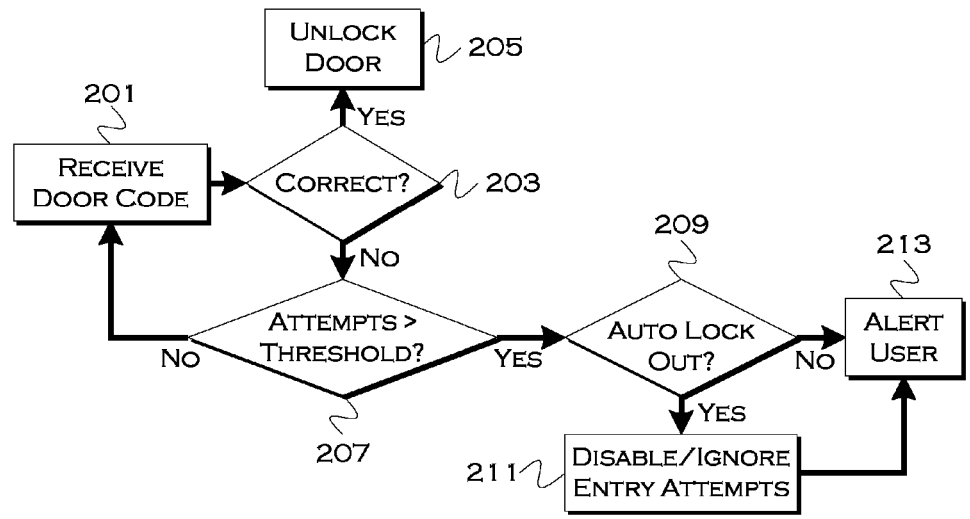
FIG. 2 shows an illustrative example of a disable and alert process.

FIG. 2 shows an illustrative example of a disable and alert process, with respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process receives a door entry code attempt input into a door code panel 201. The process determines if the attempt corresponds to a valid code 203, and, if so, unlocks the door 205.

When the code is invalid, the process, in this example, determines if an attempts-threshold has been crossed 207. This corresponds to a valid total number of possible attempts to enter the vehicle. If the threshold has not been crossed, the code-entry process continues until the door is opened or the panel is locked out.

Also, in this example, the panel (keypad) can be set for either automatic lockout (i.e., the panel is automatically disabled after a certain number of invalid attempts) or a user alert and remote lockout (i.e., following alert, the user remotely instructs lockout). If automatic lockout is enabled 209, in this example, the process will disable the panel or ignore future code entry attempts 211. This prevents brute force entry. Also, after the panel is locked, one or more registered users are alerted about the lockout 213, which can be done, for example, using an onboard modem capable of communication with a remote server or other suitable means of user notification. Upon lockout, the panel itself may or may not provide some indicia that it has been locked.

In another example, the process may not be configured for automatic lockout. A user may be concerned about a child, for example, forgetting a code and not want the child to be locked out of entry after a few attempts. In this example, the process foregoes automatic disabling of the door keypad (panel) and simply alerts the user 213. The user, as shown in FIG. 3, can then decide whether or not the panel should be disabled/ignored.

Figure 3:
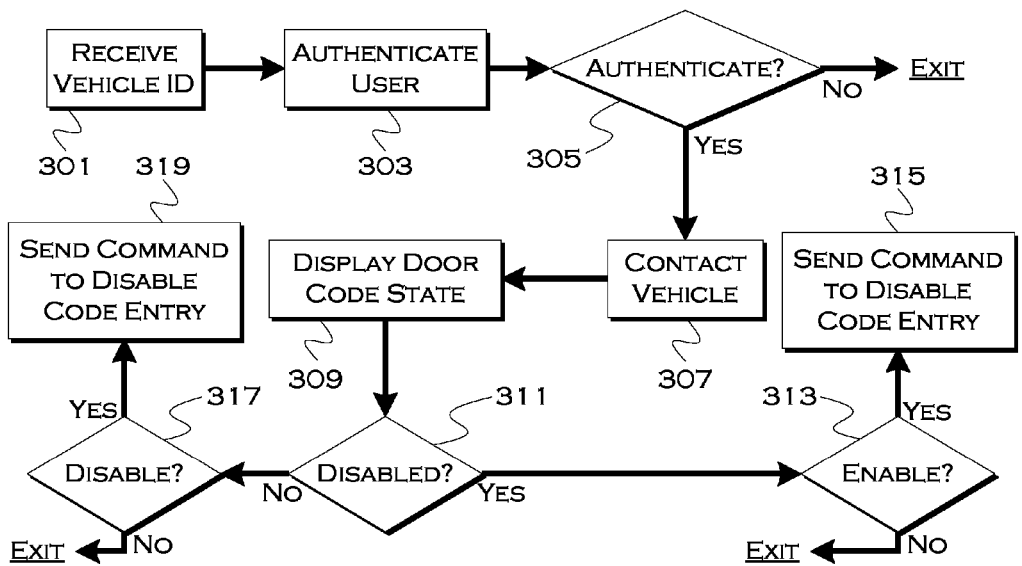
FIG. 3 shows an illustrative example of a remote enablement process.

FIG. 3 shows an illustrative example of a remote enablement process. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, a user will utilize a device remote from the vehicle to access the state control (i.e., enabled, disabled, etc.) for a keypad/panel. Here, the user inputs a vehicle ID, or the vehicle ID is associated with the device or a user ID also input 301. The process then, typically at a remote server, will authenticate the user as approved to change the keypad state for the requested vehicle 303. If the user is authenticated 305, the process will contact the vehicle 307 to obtain a state of the keypad and to allow control of the state of the keypad.

In this example, the user inputs some validation information before the vehicle is contacted, but, for example, if the vehicle contacted the user first, the user may begin partway through this process (since the user has been validated based on the contact), such as at step 309.

Once the vehicle has been contacted, the process will obtain the keypad state and instruct display of the state for the user 309. This can be, for example, without limitation, keypad disabled, keypad enabled, keypad disabled after N failed attempts, keypad enabled with N failed attempts input, etc. The user may want to change the state of the keypad to an enabled or disabled state.

If the keypad is already disabled 311, the process will provide an option to enable the keypad 313. If the user instructs keypad enablement 313, the process can send a command to enable the keypad 315. This could be done after an unauthorized party attempted to enter the vehicle while the user was away, or done so that a current entry attempt can persist. Also, in this example, the remote user could, for example, input the actual code or otherwise send an unlock command remotely, to assist the entering party (assuming the party is a valid party) with vehicle entry. The command(s) are relayed to the vehicle for execution (e.g., enable keypad and/or simply unlock vehicle).

If the keypad is not yet disabled 311, the process can present an option to disable the keypad 317. This could be, for example, after a notice about invalid attempts has been received. In another example, this entire process could be engaged even in the absence of an invalid attempt notice, in case, for example, a user was concerned that a code had been compromised and wished to generally disable keypad entry. Once the command to disable entry has been input, the process can send the command to the vehicle for execution and disabling the keypad.

By including an authorized user in the disabling/enabling process, the system can avoid inadvertent lockout of a keypad, leaving a valid user stranded if no other options for transportation or assistance are available. At the same time, brute force entry of key codes is avoided, and vehicle safety can be increased.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
   a processor configured to:
   receive a request to control a vehicle door keypad state from a remote device, the request including a vehicle identifier identifying a vehicle including the vehicle door keypad and a user identifier identifying a user requesting to change the vehicle door keypad state;
   validate the request;
   receive a current vehicle door keypad state from the vehicle;
   send the current vehicle door keypad state to the remote device; and
   send an instruction to change the vehicle door keypad state to the vehicle, responsive to an instruction to change the vehicle door keypad state received from the remote device.

2. The system of claim 1, wherein the vehicle door keypad state indicates the vehicle door keypad is enabled.

3. The system of claim 1, wherein the vehicle door keypad state indicates the vehicle door keypad is disabled.

4. The system of claim 1, wherein the processor is configured to validate the request based on a determination that the user is authorized to change the vehicle door keypad state for the vehicle.

5. The system of claim 1, wherein the processor is further configured to send an unlock code to the vehicle door keypad to unlock the vehicle, responsive to an instruction to unlock the vehicle received from the remote device.

* * * * *